United States Patent
Mishra et al.

(10) Patent No.: US 9,948,106 B2
(45) Date of Patent: Apr. 17, 2018

(54) POWER CONVERSION FOR SOLAR / WIND / WATER ENERGY

(71) Applicant: Philips Lighting Holding B.V., Eindhoven (NL)

(72) Inventors: Priya Ranjan Mishra, Bangalore (IN); Rakeshbabu Panguloori, Bangalore (IN)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 192 days.

(21) Appl. No.: 14/776,756

(22) PCT Filed: Mar. 21, 2014

(86) PCT No.: PCT/IB2014/060033
§ 371 (c)(1),
(2) Date: Sep. 15, 2015

(87) PCT Pub. No.: WO2014/155260
PCT Pub. Date: Oct. 2, 2014

(65) Prior Publication Data
US 2016/0036240 A1    Feb. 4, 2016

Related U.S. Application Data

(60) Provisional application No. 61/806,474, filed on Mar. 29, 2013.

(51) Int. Cl.
*H02J 1/00* (2006.01)
*H02J 3/38* (2006.01)
*H02J 5/00* (2016.01)

(52) U.S. Cl.
CPC .............. *H02J 3/382* (2013.01); *H02J 5/00* (2013.01)

(58) Field of Classification Search
CPC ............ H02J 3/383; H02J 7/35; Y02E 10/563
See application file for complete search history.

(56) References Cited

U.S. PATENT DOCUMENTS 4,700,390 A * 10/1987 Machida .................. G10H 1/14
                                                        381/28
7,227,278 B2    6/2007 Realmuto
(Continued)

FOREIGN PATENT DOCUMENTS

| CN | 102916602 A | 2/2013 |
| EP | 2249468 A1 | 11/2010 |
| WO | 2012143904 A2 | 10/2012 |

OTHER PUBLICATIONS

FAN9611/FAN9612 Interleaved Dual BCM PFC Controllers, Rev. 1.1.2., Fairchild Semiconductor Nov. 2010.
(Continued)

*Primary Examiner* — Sibin Chen

(57) ABSTRACT

Devices (10) convert source power from first sources (11) that receive solar/wind/water energy into load power destined for loads (13). The devices (10) comprise first converters (21) for converting first direct-current voltage signals from the first sources (11) to second direct-current voltage signals destined for the loads (13), first arrangements (31) for controlling the first converters (21) and regulating the second direct-current voltage signals in response to first control voltage signals, and first circuits (41) for providing the first control voltage signals. To prevent a collapse of the first direct-current voltage signals when having relatively small amplitudes, the first control voltage signals should have amplitudes equal to/larger than minimum values. The amplitudes of the first control voltage signal may be fixed, firstly fixed and secondly proportional to the amplitude of
(Continued)

the first direct-current voltage signal, or inversely proportional/proportional to a square of the amplitude of the first direct-current voltage signal.

14 Claims, 2 Drawing Sheets

(56) References Cited

U.S. PATENT DOCUMENTS

| | | | |
|---|---|---|---|
| 2008/0122449 A1 | 5/2008 | Besser | |
| 2012/0175956 A1* | 7/2012 | Kitamura | H02J 1/102 307/43 |
| 2012/0293000 A1* | 11/2012 | Fan | H02J 1/102 307/64 |
| 2013/0016530 A1* | 1/2013 | Lipcsei | H02M 1/40 363/16 |

OTHER PUBLICATIONS

"What is Maximum Power Point Tracking (MPPT) and How Does it Work", Blue Sky Energy 2000.
Mappus, Steve "High Efficiency, Low-Profile AC-DC Power Supply Design", 2010 Application and Design, Bodo's Power.

* cited by examiner

US 9,948,106 B2

POWER CONVERSION FOR SOLAR / WIND / WATER ENERGY

CROSS-REFERENCE TO PRIOR APPLICATIONS

This application is the U.S. National Phase application under 35 U.S.C. § 371 of International Application No. PCT/IB2014/06033, filed on Mar. 21, 2014, which claims the benefit of U.S. Provisional Patent Application No. 61/806,474, filed on Mar. 29, 2013. These applications are hereby incorporated by reference herein.

FIELD OF THE INVENTION

The invention relates to a device for converting source power from a first source into load power destined for a load. The invention further relates to a system, a method, a computer program product and a medium.

Examples of such a device are apparatuses with boost conversion.

BACKGROUND OF THE INVENTION

US 2012/0175956 A1 discloses a DC power supply feeding system comprising a first converter in the form of a DC-DC-conversion circuit and a first arrangement in the form of a control circuit for controlling the first converter.

First arrangements are generally known, such as for example interleaved boundary conduction mode power factor correction controllers, such as for example the FAN9611 and the FAN9612.

SUMMARY OF THE INVENTION

It is an object of the invention to provide an improved device. It is a further object of the invention to provide a system, an improved method, a computer program product and a medium.

According to a first aspect, a device is provided for converting source power from a first source into load power destined for a load, the first source being designed to transform solar energy, wind energy and/or water energy into the source power, the device comprising a first converter for converting a first direct-current voltage signal from the first source into a second direct-current voltage signal destined for the load, a first arrangement for controlling the first converter, the first arrangement being designed to regulate the second direct-current voltage signal of the first converter in response to a first control voltage signal, and a first circuit for providing the first control voltage signal, the first control voltage signal having an amplitude equal to or larger than a minimum value.

The device converts the source power from the first source into the load power destined for the load. This first source transforms solar energy, wind energy and/or water energy into the source power. The device comprises the first converter that converts the first direct-current voltage signal from the first source into the second direct-current voltage signal destined for the load, as also shown in US 2012/0175956 A1 via the reference sign 4. The device further comprises the first arrangement that controls the first converter and that regulates the second direct-current voltage signal of the first converter in response to the first control voltage signal, as also shown in US 2012/0175956 A1 via the reference sign 11.

The first direct-current voltage signal from the first source depends upon the momentary available amount of solar energy, wind energy or water energy, which amount may fluctuate relatively strongly. So, the amplitude of this first direct-current voltage signal may get a relatively small value. Usually, in a prior art situation, the first control voltage signal is derived from the first direct-current voltage signal in a fully proportional way, as also shown in US 2012/0175956 A1 via the reference sign 12. However, this kind of derivation has appeared to be relatively disadvantageous. When being derived from the first direct-current voltage signal in a fully proportional way, the amplitude of the first control voltage signal may get a relatively small value too. Owing to the fact that an input impedance of the first converter is proportional to the amplitude of the first control voltage signal, when the amplitude of the first control voltage signal has got a relatively small value, the input impedance of the first converter will get a relatively small value. When the input impedance of the first converter has got a relatively small value, an amplitude of a current signal flowing from the first source to the first converter will need to get a relatively large value. The combination of relatively small value of the amplitude of the first direct-current voltage signal and the relatively large value of the required current signal may result in a collapse of this first direct-current voltage signal owing to the fact that the first source can only supply a limited amount of current.

By having added the first circuit for providing the first control voltage signal, the first control voltage signal having an amplitude equal to or larger than a minimum value, the amplitude of the first voltage signal can no longer get a too small value. As a result, the first direct-current voltage signal can no longer collapse. This is a great improvement and a great advantage.

Thereto, the first circuit may be designed such that the first control voltage signal is not derived from the first direct-current voltage signal at all or such that the first control voltage signal is not derived from the first direct-current voltage signal in the fully proportional way.

An embodiment of the device is defined by the first control voltage signal having the amplitude equal to or larger than the minimum value even in case an amplitude of the first direct-current voltage signal is smaller than said minimum value. Again, the first control voltage signal should not be derived from the first direct-current voltage signal at all or should not be derived from the first direct-current voltage signal in the fully proportional way.

An embodiment of the device is defined by the amplitude being a fixed amplitude. Possibly, the amplitude may be a fixed amplitude, equal to or larger than the minimum value. This is a simple embodiment.

An embodiment of the device is defined by the first control voltage signal having a fixed amplitude for the first direct-current voltage signal having an amplitude smaller than a threshold value, and the first control voltage signal having an amplitude proportional to an amplitude of the first direct-current voltage signal for the first direct-current voltage signal having an amplitude larger than the threshold value. Possibly, in a first region, the amplitude may be a fixed amplitude equal to or larger than the minimum value, and in a second region, the amplitude may be proportional to the amplitude of the first direct-current voltage signal.

An embodiment of the device is defined by the first control voltage signal having an amplitude inversely proportional to an amplitude of the first direct-current voltage signal. Possibly, the amplitude may be inversely proportional to the amplitude of the first direct-current voltage signal, as long as equal to or larger than the minimum value.

An embodiment of the device is defined by the first control voltage signal having an amplitude proportional to a square of an amplitude of the first direct-current voltage signal. Possibly, the amplitude may be proportional to the square of the amplitude of the first direct-current voltage signal, as long as equal to or larger than the minimum value.

An embodiment of the device is defined by a combination of the first arrangement and the first circuit being designed to modify a frequency and/or a turn-on time of the first converter to increase an input impedance of the first converter for the first direct-current voltage signal having a relatively small amplitude. When the amplitude of the first control voltage signal is decreased, the frequency of the first converter is decreased and the turn-on time of the first converter is increased. So, the combination of the first arrangement and the first circuit should, to prevent the collapse of the first direct-current voltage signal, prevent that the input impedance of the first converter gets a relatively small value, by preventing that the frequency of the first converter gets a relatively small value and/or by preventing that the turn-on time of the first converter gets a relatively large value. This is for example realized by avoiding that the amplitude of the first control voltage signal gets a value smaller than the minimum value.

An embodiment of the device is defined by the first arrangement comprising an interleaved boundary conduction mode power factor correction controller.

An embodiment of the device is defined by the first arrangement further being designed to regulate a power factor. Usually, the first arrangement has an option to regulate a power factor, but in this particular case, where the first converter is converting the first direct-current voltage signal into the second direct-current voltage signal, this option is not used.

An embodiment of the device is defined by further comprising a second converter for converting a first alternating-current voltage signal from a second source into a third direct-current voltage signal, a second arrangement for controlling the second converter, the second arrangement being designed to regulate the third direct-current voltage signal of the second converter, and a second circuit for combining the second direct-current voltage signal and the third direct-current voltage signal into a load signal destined for the load. The second converter, the second arrangement and the second circuit allow a second source such as a mains supply to support the first source whenever necessary.

An embodiment of the device is defined by further comprising a detector for detecting a parameter of a signal and for in response to a detection result providing a second control voltage signal to the second arrangement. Preferably, the second converter is controlled in dependence of the parameter of the signal for managing the power contributions from the first and second converters in the device. Thereto, the amount of power supplied via the second converter is adapted in dependence of the parameter of the signal. The parameter of the signal may be a parameter of the load signal, a parameter of an input signal of the first converter, a parameter of an output signal of the first converter, a parameter of an input signal of the second converter and/or a parameter of an output signal of the second converter. Each input signal and each output signal may be a voltage signal or a current signal.

According to a second aspect, a system is provided comprising the device as defined above and further comprising the first source and/or the load.

According to a third aspect, a method is provided for a device for converting source power from a first source into load power destined for a load, the first source being designed to transform solar energy, wind energy and/or water energy into the source power, the device comprising a first converter for converting a first direct-current voltage signal from the first source into a second direct-current voltage signal destined for the load, and a first arrangement for controlling the first converter, the first arrangement being designed to regulate the second direct-current voltage signal of the first converter in response to a first control voltage signal, the method comprising a step of providing the first control voltage signal having an amplitude equal to or larger than a minimum value.

According to a fourth aspect, a computer program product is provided for, when run on a computer, performing the step of the method as defined above.

According to a fifth aspect, a medium is provided for storing and comprising the computer program product as defined above.

An insight is that the amplitude of the first control voltage signal should not get a too small value. A basic idea is that the first control voltage signal should have an amplitude equal to or larger than a minimum value.

A problem to provide an improved device has been solved. A further advantage is that the device has become more stable and has got a larger working area.

These and other aspects of the invention will be apparent from and elucidated with reference to the embodiments described hereinafter.

DETAILED DESCRIPTION OF EMBODIMENTS

Figure 1:
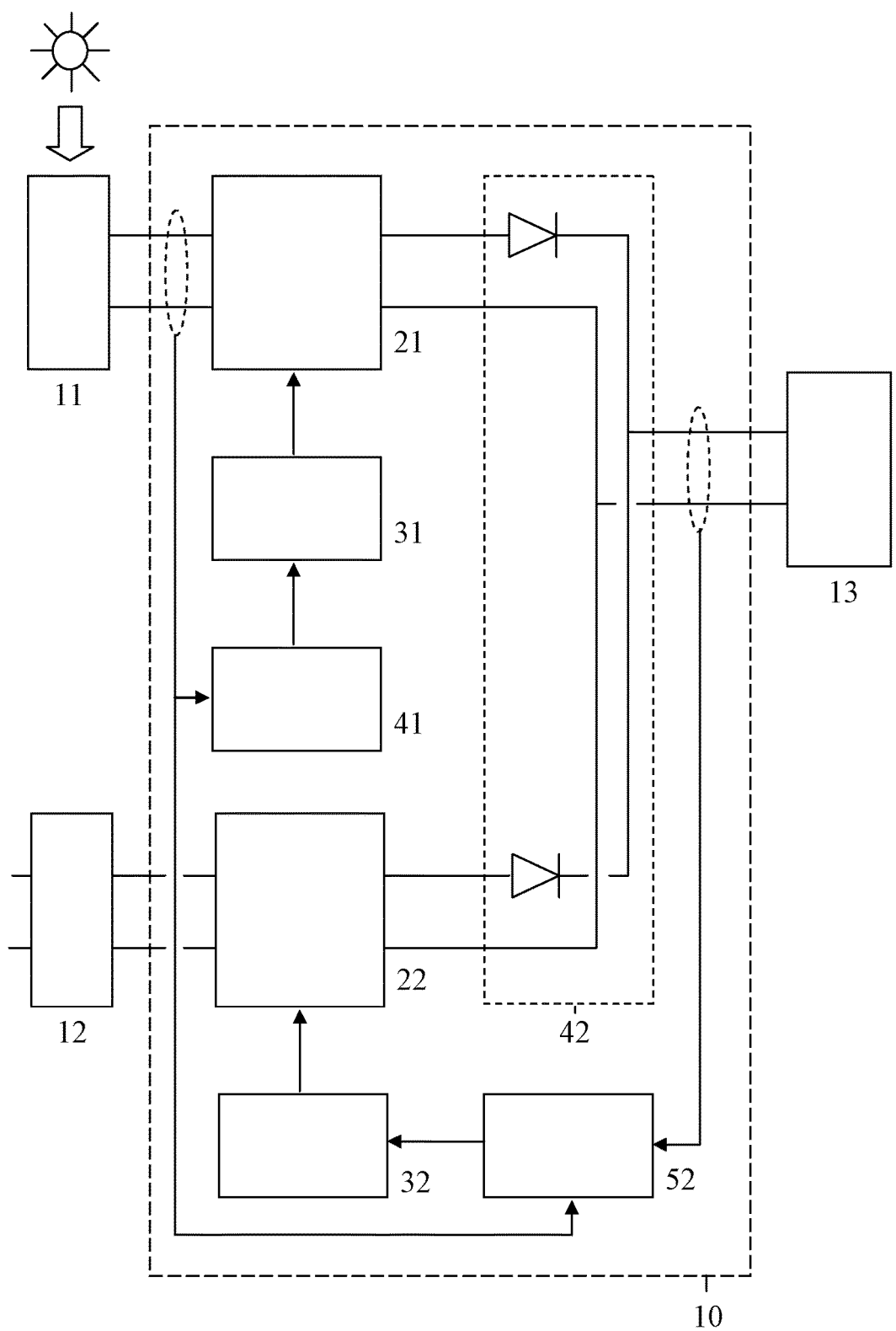
FIG. 1 shows an embodiment of a device.

In the FIG. 1, an embodiment of a device 10 is shown. The device 10 converts source power from a first source 11 into load power destined for a load 13. The first source 11 transforms solar energy, wind energy and/or water energy into the source power. The device 10 comprises a first converter 21 with inputs coupled to outputs of the first source 11 for receiving a first direct-current voltage signal from the first source 11 and with outputs for providing a second direct-current voltage signal. A first arrangement 31 controls the first converter 21 and regulates the second direct-current voltage signal of the first converter 21 in response to a first control voltage signal. Thereto, a control output of the first arrangement 31 is coupled to a control input of the first converter 21. A first circuit 41 provides the first control voltage signal. Thereto, a control output of the first circuit 41 is coupled to a control input of the first arrangement 31. This first control voltage signal has an amplitude equal to or larger than a minimum value, to prevent a collapse of the first direct-current voltage signal when having a relatively small amplitude.

As an example only, the first control voltage signal may have the amplitude equal to or larger than the minimum value even in case an amplitude of the first direct-current voltage signal is smaller than said minimum value.

The first arrangement 31 comprises for example an interleaved boundary conduction mode power factor correction controller, such as for example the FAN9611 and the FAN9612, or any other kind of boundary conduction mode controller. The first arrangement 31 may further regulate a power factor when used in a different environment. As an example, for the FAN9612, the control input is the pin-number-ten of the chip, also known as v-in.

In a minimum situation, the outputs of the first converter 11 are coupled to inputs of the load 13 and the second direct-current voltage signal is provided to the load 13. In a more extended situation, the device 10 may further comprise a second converter 22 with inputs coupled to outputs of a second source 12 for receiving a first alternating-current voltage signal from the second source 12 and with outputs for providing a third direct-current voltage signal. A second arrangement 32 controls the second converter 22 and regulates the third direct-current voltage signal of the second converter 22. Thereto, a control output of the second arrangement 32 is coupled to a control input of the second converter 22. A second circuit 42 combines the second direct-current voltage signal and the third direct-current voltage signal into a load signal destined for the load 13. Thereto, first inputs of the second circuit 42 are coupled to the outputs of the first converter 21, second inputs of the second circuit 42 are coupled to the outputs of the second converter 22, and outputs of the second circuit 42 are coupled to the inputs of the load 13. The second circuit 42 comprises for example two diodes, but may alternatively comprise two resistors or any other kind of combination circuitry. A first diode couples one of the outputs of the first converter 21 to one of the inputs of the load 13, a second diode couples one of the outputs of the second converter 22 to said one of the inputs of the load 13, and the other outputs and input are coupled directly to each other. The device 10 may further comprise a detector 52 for detecting a parameter of a signal and for in response to a detection result providing a second control voltage signal to the second arrangement 32. Thereto, an output of the detector 52 is coupled to a control input of the second arrangement 32.

The second converter 22, the second arrangement 32 and the second circuit 42 allow the second source 12 such as a mains supply to support the first source 11 whenever necessary. Preferably, the second converter 22 is controlled in dependence of the parameter of the signal for managing the power contributions from the first and second converters 21, 22 in the device 10. Thereto, the amount of power supplied via the second converter 22 is adapted in dependence of the parameter of the signal. The parameter of the signal may be a parameter of the load signal, a parameter of an input signal of the first converter 21, a parameter of an output signal of the first converter 21, a parameter of an input signal of the second converter 22 and/or a parameter of an output signal of the second converter 22. Of all these possibilities, in the FIG. 1, as an example only, a detection of a parameter of the input signal of the first converter 21 and a detection of a parameter of the load signal are shown.

Figure 2:
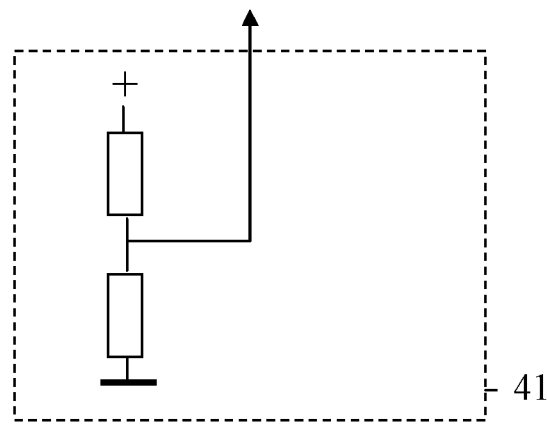
FIG. 2 shows an embodiment of a first circuit.

In the FIG. 2, an embodiment of a first circuit 41 is shown. The first circuit 41 comprises two resistors coupled serially between ground and a voltage source. An interconnection between both resistors is coupled to the control input of the first arrangement 31 for providing the first control voltage signal having a fixed amplitude. So, in this case, the first circuit 41 does not need any information about the first direct-current voltage signal exchanged from the first source 11 to the first converter 21.

Figure 3:
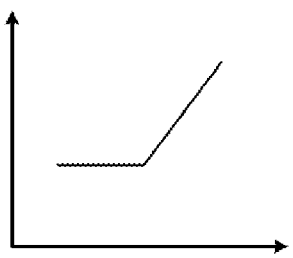
FIG. 3 shows a first voltage function.

In the FIG. 3, a first voltage function is shown (horizontal axis: first direct-current voltage signal, vertical axis: first control voltage signal). This first control voltage signal has a fixed amplitude for the first direct-current voltage signal having an amplitude smaller than a threshold value, and the first control voltage signal has an amplitude proportional to an amplitude of the first direct-current voltage signal for the first direct-current voltage signal having an amplitude larger than the threshold value.

Figure 4:
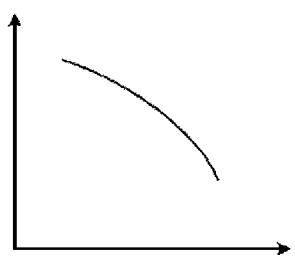
FIG. 4 shows a second voltage function.

In the FIG. 4, a second voltage function is shown (horizontal axis: first direct-current voltage signal, vertical axis: first control voltage signal). This first control voltage signal has an amplitude inversely proportional to an amplitude of the first direct-current voltage signal, here in a non-linear way.

Figure 5:
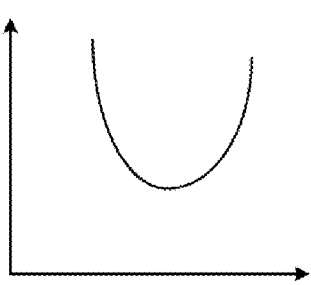
FIG. 5 shows a third voltage function.

In the FIG. 5, a third voltage function is shown (horizontal axis: first direct-current voltage signal, vertical axis: first control voltage signal). This first control voltage signal has an amplitude proportional to a square of an amplitude of the first direct-current voltage signal.

Many other voltage functions can be realized via the first circuit 41, as long as the first control voltage signal will have the amplitude equal to or larger than the minimum value. To explain the above in other words, in general a combination of the first arrangement 31 and the first circuit 41 should modify a frequency and/or a turn-on time of the first converter 21 to increase an input impedance of the first converter 21 for the first direct-current voltage signal having a relatively small amplitude. More in particular, when the amplitude of the first control voltage signal is decreased, the frequency of the first converter is decreased and the turn-on time of the first converter is increased. So, the combination of the first arrangement and the first circuit should, to prevent the collapse of the first direct-current voltage signal, prevent that the input impedance of the first converter gets a relatively small value, by preventing that the frequency of the first converter gets a relatively small value and/or by preventing that the turn-on time of the first converter gets a relatively large value. This is for example realized by avoiding that the amplitude of the first control voltage signal gets a value smaller than the minimum value.

Summarizing, devices 10 convert source power from first sources 11 that receive solar/wind/water energy into load power destined for loads 13. The devices 10 comprise first converters 21 for converting first direct-current voltage signals from the first sources 11 to second direct-current voltage signals destined for the loads 13, first arrangements 31 for controlling the first converters 21 and regulating the second direct-current voltage signals in response to first control voltage signals, and first circuits 41 for providing the first control voltage signals. To prevent a collapse of the first direct-current voltage signals when having relatively small amplitudes, the first control voltage signals should have amplitudes equal to/larger than minimum values. The amplitudes of the first control voltage signal may be fixed, firstly fixed and secondly proportional to the amplitude of the first direct-current voltage signal, or inversely proportional/proportional to a square of the amplitude of the first direct-current voltage signal.

While the invention has been illustrated and described in detail in the drawings and foregoing description, such illustration and description are to be considered illustrative or

The invention claimed is:

1. A device for converting source power from a first source into load power destined for a load, the first source being designed to transform solar energy, wind energy and/or water energy into the source power, the device comprising
a first converter for converting a first direct-current voltage signal from the first source into a second direct-current voltage signal destined for the load,
a first arrangement for controlling the first converter, the first arrangement being designed to regulate the second direct-current voltage signal of the first converter in response to a first control voltage signal, and
a first circuit for receiving the first direct-current voltage signal as its only voltage source and for providing the first control voltage signal, the first control voltage signal having an amplitude equal to or larger than a minimum value, the first control voltage signal having the amplitude equal to or larger than the minimum value even in case an amplitude of the first direct-current voltage signal is smaller than said minimum value, and wherein the first control voltage signal having a fixed amplitude for the first direct-current voltage signal having an amplitude smaller than a threshold value, and the first control voltage signal having an amplitude proportional to an amplitude of the first direct-current voltage signal for the first direct-current voltage signal having an amplitude larger than the threshold value.

2. The device as defined in claim 1, wherein the first control voltage signal is not derived from the first direct-current voltage signal at all or the first control voltage signal is not derived from the first direct-current voltage signal in a fully proportional way.

3. The device as defined in claim 1, wherein the amplitude of the first control voltage signal is a fixed amplitude.

4. The device as defined in claim 1, the first control voltage signal having an amplitude inversely proportional to an amplitude of the first direct-current voltage signal.

5. The device as defined in claim 1, the first control voltage signal having an amplitude proportional to a square of an amplitude of the first direct-current voltage signal.

6. The device as defined in claim 1, a combination of the first arrangement and the first circuit being designed to modify a frequency and/or a turn-on time of the first converter to increase an input impedance of the first converter for the first direct-current voltage signal having a relatively small amplitude.

7. The device as defined in claim 1, the first arrangement comprising an interleaved boundary conduction mode power factor correction controller.

8. The device as defined in claim 1, the first arrangement further being designed to regulate a power factor.

9. The device as defined in claim 1, further comprising
a second converter for converting a first alternating-current voltage signal from a second source into a third direct-current voltage signal,
a second arrangement for controlling the second converter, the second arrangement being designed to regulate the third direct-current voltage signal of the second converter, and
a second circuit for combining the second direct-current voltage signal and the third direct-current voltage signal into a load signal destined for the load.

10. The device as defined in claim 9, further comprising
a detector for detecting a parameter of a signal and for in response to a detection result providing a second control voltage signal to the second arrangement;
wherein the parameter of the signal is selected from the group consisting of a parameter of the load signal, a parameter of an input signal of the first converter, a parameter of an output signal of the first converter, a parameter of an input signal of the second converter, and a parameter of an output signal of the second converter.

11. A system comprising the device as defined in claim 1 and further comprising the first source and/or the load.

12. A method for a device for converting source power from a first source into load power destined for a load, the first source being designed to transform solar energy, wind energy and/or water energy into the source power, the device comprising a first converter for converting a first direct-current voltage signal from the first source into a second direct-current voltage signal destined for the load, and a first arrangement for controlling the first converter, the first arrangement being designed to regulate the second direct-current voltage signal of the first converter in response to a first control voltage signal, the method comprising a step of:
relying upon a single voltage source, the single voltage source being the first direct-current voltage signal, providing the first control voltage signal having an amplitude equal to or larger than a minimum value, the first control voltage signal having the amplitude equal to or larger than the minimum value even in case an amplitude of the first direct-current voltage signal is smaller than said minimum value and wherein the first control voltage signal having a fixed amplitude for the first direct-current voltage signal having an amplitude smaller than a threshold value, and the first control voltage signal having an amplitude proportional to an amplitude of the first direct-current voltage signal for the first direct-current voltage signal having an amplitude larger than the threshold value.

13. A computer program product for, when run on a computer, performing the step of the method as defined in claim 12.

14. A medium for storing and comprising the computer program product as defined in claim 13.

* * * * *